Feb. 10, 1953      V. L. CRILE      2,627,626
BEARING MOUNTING
Filed Nov. 10, 1949
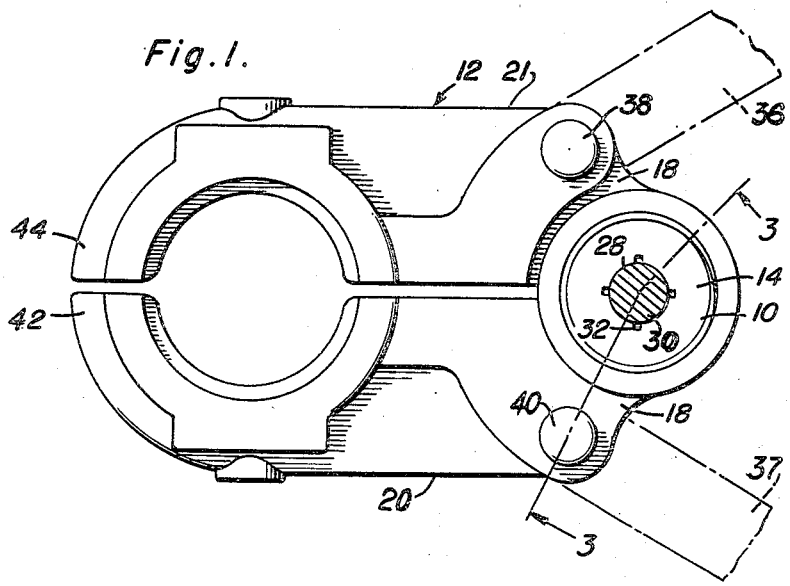
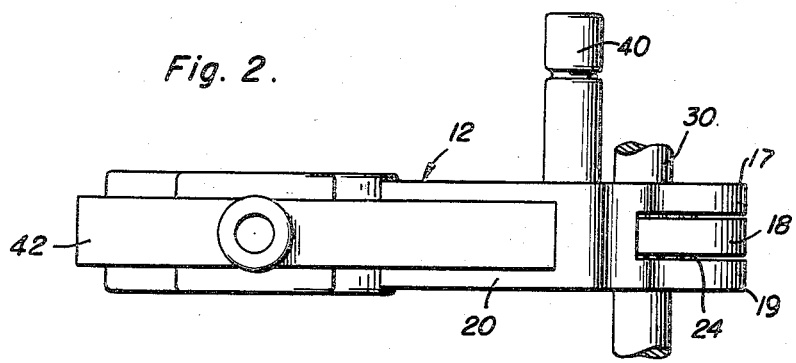
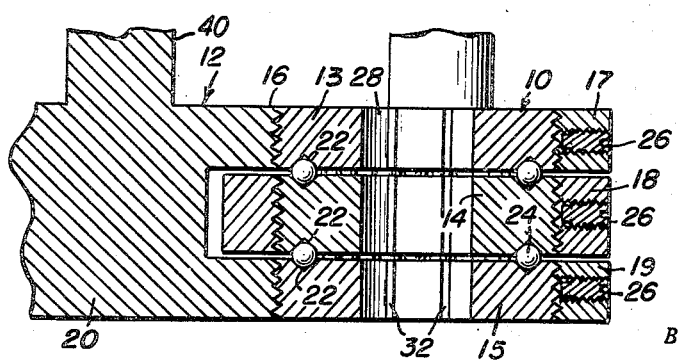
Vaughn L. Crile
INVENTOR.

Patented Feb. 10, 1953

2,627,626

UNITED STATES PATENT OFFICE 2,627,626

BEARING MOUNTING

Vaughn L. Crile, Washington, Pa.

Application November 10, 1949, Serial No. 126,573

2 Claims. (Cl. 16—131)

This invention comprises novel and useful improvements in antifriction bearings, and more particularly pertains to adjustable antifriction bearings means for hinges.

An important object of this invention is to provide an adjustable antifriction bearing means for hinges.

Another important object of this invention is to provide an antifriction bearing means for hinges which bearing means will constrain pivotal movement of the plates of the hinge about a definite axis without the necessity of a hinge pin.

Yet another object of this invention, in accordance with the foregoing objects, is to provide a hinge in which the lugs of one plate are adjustable relative to the lugs of the other plate.

An important feature of this invention resides in the provision for annular recesses in the adjacent faces of the lugs with bearings in said recesses separating said lugs and constraining pivotal movement of the hinge plates about the axis of said annular recesses.

Another feature of this invention resides in the provision for annular members in said lugs with the bearing means formed in said annular members, each of said annular members being adjustable relative to said lugs, thereby providing a hinge wherein the bearing means and hinge plates are adjustable.

These together with various ancillary objects and features are attained by this invention, a preferred embodiment of which has been illustrated by way of example only in the accompanying drawings wherein:

Figure 1 is a fragmentary top elevational view of a hinged split ring holder having the adjustable antifriction bearing means;

Figure 2 is a fragmentary side elevational view of a hinged split ring holder having the adjustable antifriction bearing means;

Figure 3 is a fragmentary sectionalized side view of the multiple lugged split ring holder taken substantially on the plane 3—3 of Figure 1 showing the adjustable antifriction bearing means mounted in the lugs of the hinge plates.

Turning now to the accompanying drawings wherein like numerals designate similar parts throughout the various views, Figure 1 shows the antifriction bearing means indicated generally by the numeral 10 mounted in a split ring holder indicated generally by the numeral 12. The antifriction bearing means 10 are shown attached on a split ring holder of the type disclosed in McNamara Patent 2,006,056 but obviously the bearing means are adaptable to numerous other uses, the split ring holder merely being one use in which all of the advantages of the adjustable bearing means are utilized.

As more clearly set forth in Figure 3 the adjustable antifriction bearing means 10 consists of annular members 13, 14 and 15 mounted in any desired manner such as by the threaded means 16 to the interlocking lugs 17, 18 and 19 of the hinge plates 20 and 21. It can readily be perceived from a consideration of Figure 3 that each of the annular members 13, 14 and 15 is adjustable relative to the lug 17, 18 and 19 to which it is attached.

Recessed in the adjacent faces of the annular members 13—14 and 14—15 are annular grooves 22 which grooves are preferably coaxial with the annular members 13, 14 and 15. Resting in the grooves 22 are multiple bearings indicated by the numeral 24, which bearings laterally space the faces of the adjacent faces of the annular members 13, 14 and 15 and consequently space the lugs 17, 18 and 19 with respect to each other.

It is believed apparent that the annular members 13, 14 and 15 can be adjusted relative to each other so as to loosen or tighten the antifriction bearing means, and that the annular members 13, 14 and 15 can be also adjusted relative to the lugs 17, 18 and 19 to which they are secured, so as to permit lateral adjustment of one hinge plate 20 relative to the other 21, thereby providing a means for adjusting a body such as one jaw 42 of a split ring holder 20, to which the lugs 17 and 19 are attached relative to the other body which may be the other jaw 44 of a split ring holder.

Mounted in the lugs 17, 18 and 19 are means for locking the annular members 13, 14 and 15 relative to the lugs 17, 18 and 19, such means being of any suitable construction such as the set screws 26.

As the needs may require, the annular members 14 may be provided with coaxial bores 28 which may provide suitable means for receiving a pin 30 or the like by which the hinged device is supported. It is to be noted however that the pin 30 does not form a necessary part of the adjustable antifriction bearing means 10 for the hinge, the bearing means 10 providing adequate means for constraining pivotal movement of the plates 20 and 21 of the hinge about an axis coaxial with that of the bearings.

Any means may be supplied for rotating said annular members 13, 14 and 15 relative to their respective lugs 17, 18 and 19 so as to adjust the bearings, such as the vertical slots 32 provided in the bore 28, for engagement by any suitable ribbed device.

For purposes of illustration, an explanation of the operation of the adjustable antifriction bearing means 10 will be given with the bearings 10 mounted on a split ring holder 12 actuated by the operating handles 36 and 38 mounted on the operating studs 38 and 40.

Split ring holders are used in the manufacture of the threads on bottles and the like, thread molds being insertable in the jaws 42 and 44 of the split ring holder 12. In the molding process, an opening and closing of the jaws 42 and 44 is required for each operation, and due to the necessity of having perfectly formed threads on bottles, proper alignment of the jaws 42 and 44 is necessary at all times. Accordingly misalignment due to wear is substantially reduced by the use of antifriction bearing means 10, such as that previously described. However, in the event that the bearing means 10 do become worn, it is possible to tighten the bearings by suitable adjustment of the annular members 13, 14 and 15 relative to the lugs 17, 18 and 19. If the jaws 42 and 44 are not yet aligned, lateral displacement of one jaw relative to the other can be accomplished by suitable raising or lowering of each of the annular members 13, 14 and 15 relative to their respective lugs 17, 18 and 19, the raising or lowering of the annular members 13, 14 and 15 relative to the lugs 17, 18 and 19 being accomplished by either clockwise or counterclockwise rotary motion being applied to the members 13, 14 and 15 by any suitable flanged tool insertable in the slots 32 of the bores 28.

From the foregoing the construction and operation of the device are believed to be readily understandable and accordingly further discussion is believed to be unnecessary. However, since numerous modifications will readily occur to those skilled in the art after a consideration of the foregoing specification and accompanying drawings, it is not desired to limit the invention to that shown and described, and accordingly, the principles of the invention are to be regarded as limited only by the scope of the appended claims.

Having described the invention, what is claimed as new is:

1. A hinge comprising a first hinge plate having a pair of spaced lugs, said lugs each having an annular bearing groove formed in the inner faces thereof, a member having annular bearing grooves formed in the opposed faces thereof, said member being interposed between said lugs with each of the bearing grooves on the member registering with the bearing groove in a different one of said lugs, bearing elements disposed in the grooves between the member and the lugs, a second hinge plate, and means attaching said second hinge plate to said member for movement relative thereto parallel to the axis of rotation of said member relative to said lugs.

2. A hinge comprising a first hinge plate having first and second relatively spaced lugs, a first member attached to said first lug for movement relative thereto towards and away from said second lug, said first member having an annular bearing groove on the side thereof which faces said second lug, said second lug having an annular bearing groove in the side thereof which faces said first member, a second member having annular bearing grooves in opposite sides thereof, said second member being interposed between the lugs of said first hinge plate with one of the grooves in the second member in registry with the groove in the first member and with the other groove in registry with the groove in the second lug, bearing elements disposed in the grooves, a second hinge plate, and means attaching said second hinge plate to said second member for movement relative thereto parallel to the axis of rotation of said second member relative to said first hinge plate.

VAUGHN L. CRILE.

REFERENCES CITED

The following references are of record in the file of this patent:

UNITED STATES PATENTS

| Number | Name | Date |
|---|---|---|
| 493,190 | Smith | Mar. 7, 1893 |
| 510,833 | Blackmore | Dec. 12, 1898 |
| 1,364,948 | Mountain | Jan. 11, 1921 |
| 1,475,524 | Thomas | Nov. 27, 1923 |
| 2,268,013 | Berley et al. | Dec. 30, 1941 |